US011104257B2

(12) United States Patent
Hashimoto et al.

(10) Patent No.: US 11,104,257 B2
(45) Date of Patent: Aug. 31, 2021

(54) NOTIFICATION APPARATUS AND NOTIFICATION METHOD

(71) Applicant: CLARION CO., LTD., Saitama (JP)

(72) Inventors: Takeshi Hashimoto, Saitama (JP); Yasuhiro Fujita, Saitama (JP)

(73) Assignee: CLARION CO., LTD., Saitama (JP)

(*) Notice: Subject to any disclaimer, the term of this patent is extended or adjusted under 35 U.S.C. 154(b) by 0 days.

(21) Appl. No.: 16/981,283

(22) PCT Filed: Mar. 19, 2019

(86) PCT No.: PCT/JP2019/011622
§ 371 (c)(1),
(2) Date: Sep. 16, 2020

(87) PCT Pub. No.: WO2019/181991
PCT Pub. Date: Sep. 26, 2019

(65) Prior Publication Data
US 2021/0039538 A1    Feb. 11, 2021

(30) Foreign Application Priority Data

Mar. 19, 2018    (JP) .............................. JP2018-050400

(51) Int. Cl.
*H04B 3/36*        (2006.01)
*B60N 2/90*        (2018.01)

(52) U.S. Cl.
CPC .......... *B60N 2/90* (2018.02); *B60N 2002/981* (2018.02)

(58) Field of Classification Search
CPC .............................. B60N 2/90; B60N 2002/981
(Continued)

(56) References Cited

U.S. PATENT DOCUMENTS 9,475,502 B2 * 10/2016 Fung ..................... A61B 5/6893
2004/0201481 A1 * 10/2004 Yoshinori ................ B60N 2/56
340/575
(Continued)

FOREIGN PATENT DOCUMENTS

DE     102006014056    10/2006
JP     2008-129716     6/2008

OTHER PUBLICATIONS

International Search Report for corresponding International Application No. PCT/JP2019/011622, dated May 28, 2019.
(Continued)

*Primary Examiner* — Zhen Y Wu
(74) *Attorney, Agent, or Firm* — Mori & Ward, LLP

(57) ABSTRACT

A notification apparatus (1a) includes a first signal converter (50) disposed in a cushion of a seat (80) and configured to convert a vibration transmitted to the seat (80) into a seat vibration signal, a second signal converter (60) disposed in a position other than the cushion and configured to detect a transmitted vibration and to convert into an input vibration signal, a level difference calculator (30a) configured to calculate a signal level difference ΔG by subtracting a signal level of the seat vibration signal from a signal level of the input vibration signal, a notification aspect determination unit (100) configured to determine a notification aspect for making a notification to a user, on the basis of a value of the signal level difference ΔG, and a notification execution unit (55) configured to, when acquiring notification information, make the notification on the basis of the notification aspect.

10 Claims, 10 Drawing Sheets

(58) Field of Classification Search
USPC .................................................... 340/407.1
See application file for complete search history.

(56) References Cited

U.S. PATENT DOCUMENTS

| | | | | |
|---|---|---|---|---|
| 2006/0219459 A1* | 10/2006 | Suzuki | ................... | G08B 21/06 |
| | | | | 180/273 |
| 2006/0255920 A1* | 11/2006 | Maeda | ................. | B60N 2/0232 |
| | | | | 340/407.1 |
| 2008/0071177 A1* | 3/2008 | Yanagidaira | ........... | G08B 21/06 |
| | | | | 600/483 |
| 2009/0051206 A1* | 2/2009 | Fujita | ................... | B60N 2/7094 |
| | | | | 297/452.49 |
| 2010/0049066 A1* | 2/2010 | Hatakeyama | .......... | A61B 5/316 |
| | | | | 600/509 |
| 2012/0296567 A1* | 11/2012 | Breed | .................... | G01C 21/26 |
| | | | | 701/468 |
| 2012/0330113 A1* | 12/2012 | Kogure | ................... | A61B 5/11 |
| | | | | 600/301 |
| 2012/0330173 A1* | 12/2012 | Park | ......................... | A61B 5/01 |
| | | | | 600/521 |
| 2013/0012837 A1* | 1/2013 | Kogure | .................. | A61B 5/113 |
| | | | | 600/595 |
| 2014/0097957 A1* | 4/2014 | Breed | ................ | G08B 21/0407 |
| | | | | 340/576 |
| 2014/0276090 A1* | 9/2014 | Breed | ................ | A61B 5/14546 |
| | | | | 600/473 |
| 2017/0360373 A1* | 12/2017 | Montgomery | ......... | A61B 5/352 |
| 2019/0117144 A1* | 4/2019 | Carraro | .................. | G08B 21/06 |
| 2019/0121356 A1* | 4/2019 | Migneco | .............. | A61B 5/7264 |
| 2019/0167941 A1* | 6/2019 | Yamaguchi | ............ | B60N 2/976 |
| 2019/0168666 A1* | 6/2019 | Nomura | ................... | B60Q 3/54 |

OTHER PUBLICATIONS

Written Opinion for corresponding International Application No. PCT/JP2019/011622, dated May 28, 2019.
Supplementary European Search Report for corresponding EP Application No. 19770376.2, dated Feb. 17, 2021.

* cited by examiner

NOTIFICATION APPARATUS AND NOTIFICATION METHOD

TECHNICAL FIELD

The present invention relates to a notification apparatus and notification method and, more specifically, to a notification apparatus and notification method that make a notification using a vibration.

BACKGROUND ART

As vehicle notification apparatuses, there have been proposed apparatuses that alarm the driver by vibrating the vehicle seat (for example, see Patent Literature 1).

For example, vibration generators that vibrate in the vicinity of the thighs of the seated person are disposed in left and right positions of a seat of a vehicle provided with a marking identification unit that identifies the lane markings between the travel lanes. When the marking identification unit determines that a predetermined left portion of the vehicle has crossed the left marking, a notification about the departure direction is made to the seated person by vibrating the left vibration generator in the vehicle seat. Also, when the marking identification unit determines that a predetermined right portion of the vehicle has crossed the right marking, a notification about the departure direction is made to the seated person by vibrating the right vibration generator in the vehicle seat.

CITATION LIST

Patent Literature

PTL 1: Japanese Unexamined Patent Application Publication No. 2008-129716

SUMMARY OF INVENTION

Technical Problem

However, in the case of the apparatus that includes the vibration generators disposed in the vehicle seat and makes a notification by causing the seated person to perceive a vibration, the magnitude of the vibration perceived by the seated person varies with the sitting posture or the like of the seated person.

For example, when the seated person is sitting on the vehicle seat in an improper posture, a lower pressure tends to be applied from the seat surface to the seat cushion. In this case, even if a vibration generator disposed in the seat cushion generates a vibration, the seated person tends to perceive the vibration transmitted through the seat cushion as a weaker vibration. That is, when the seated person is not sitting in a proper posture with respect to the positions in which the vibration generators are disposed, the apparatus is not able to sufficiently transmit the vibration to the seated person, resulting in a reduction in the perceptibility of the vibration to the seated person.

The present invention has been made in view of the above-mentioned issues, and an object thereof is to provide a notification apparatus and notification method that are able to cause the seated person to sufficiently perceive a notification, regardless of the sitting state of the seated person.

Solution to Problem

A notification apparatus according to one aspect of the present invention includes a first signal converter disposed in a cushion of a seat and configured to detect a vibration transmitted to the seat and to convert the vibration into a seat vibration signal, a second signal converter disposed in a position other than the cushion of the seat and configured to detect a transmitted vibration and to convert the vibration into an input vibration signal, a level difference calculator configured to acquire the seat vibration signal from the first signal converter, to acquire the input vibration signal from the second signal converter, and to calculate a signal level difference $\Delta G$ by subtracting a value of a level of the seat vibration signal from a value of a level of the input vibration signal, a notification aspect determination unit configured to determine a notification aspect for making a notification to a user, on the basis of a value of the signal level difference $\Delta G$ calculated by the level difference calculator, and a notification execution unit configured to, when acquiring notification information outputted when a notification situation detector detects a situation about which a notification is made, make the notification on the basis of the notification aspect determined by the notification aspect determination unit.

A notification method according to another aspect of the present invention includes detecting, by a first signal converter disposed in a cushion of a seat, a vibration transmitted to the seat and converting the vibration into a seat vibration signal, detecting, by a second signal converter disposed in a position other than the cushion of the seat, a transmitted vibration and converting the vibration into an input vibration signal, acquiring, by a level difference calculator, the seat vibration signal from the first signal converter, acquiring the input vibration signal from the second signal converter, and calculating a signal level difference $\Delta G$ by subtracting a value of a level of the seat vibration signal from a value of a level of the input vibration signal, determining, by a notification aspect determination unit, a notification aspect for making a notification to a user, on the basis of a value of the signal level difference $\Delta G$ calculated by the level difference calculator, and when acquiring notification information outputted when a notification situation detector detects a situation about which a notification is made, making, by a notification execution unit, the notification on the basis of the notification aspect determined by the notification aspect determination unit.

The notification apparatus and notification method calculate the signal level difference $\Delta G$ by subtracting the value of the level of the seat vibration signal acquired from the first signal converter from the value of the level of the input vibration signal acquired from the second signal converter and determine the notification aspect for making a notification to the user, on the basis of the calculated signal level difference $\Delta G$.

Since the first signal converter is disposed in the cushion of the seat, the level of the seat vibration signal varies with the pressure applied to the cushion. That is, the level of the seat vibration signal varies with the sitting state, such as whether the user is sitting on the seat in a proper posture. On the other hand, since the second signal converter is disposed in the position other than the cushion of the seat, the level of the input vibration signal is not influenced by the sitting state of the seated person. Accordingly, the value of the signal level difference $\Delta G$ calculated by subtracting the value of the level of the seat vibration signal from the value of the level of the input vibration signal varies with whether the seated person is sitting on the seat in a proper posture.

For this reason, the notification apparatus and notification method determine the notification aspect using the signal level difference $\Delta G$ whose value varies with whether the user is sitting on the seat in a proper posture. By making the notification on the basis of the determined notification aspect, the notification apparatus and notification method are able to determine the notification aspect suitable for the sitting state of the seated person and to cause the seated person to sufficiently perceive the notification.

In the notification apparatus, the notification aspect determination unit may include a control level determination unit configured to determine a control level on the basis of the value of the signal level difference $\Delta G$ calculated by the level difference calculator, a notification signal generator configured to generate a notification signal on the basis of the notification information, and a notification signal controller configured to control a level of the notification signal generated by the notification signal generator on the basis of the control level determined by the control level determination unit. The notification execution unit may be a vibration converter configured to convert the notification signal controlled by the notification signal controller into a notification vibration and to output the notification vibration in the seat.

In the notification method, the notification aspect determination unit may include a control level determination unit, a notification signal generator, and a notification signal controller. The notification execution unit may include a vibration converter. The control level determination unit determines a control level on the basis of the value of the signal level difference $\Delta G$ calculated by the level difference calculator. The notification signal generator generates a notification signal on the basis of the notification information. The notification signal controller controls a level of the notification signal generated by the notification signal generator on the basis of the control level determined by the control level determination unit. The vibration converter converts the notification signal controlled by the notification signal controller into a notification vibration and outputs the notification vibration in the seat.

The notification apparatus and notification method determine the control level using the signal level difference $\Delta G$ whose value varies with whether the seated person is sitting on the seat in a proper posture and control the level of the notification signal on the basis of the control level. Thus, the notification apparatus and notification method are able to properly control or change the level of the notification vibration in accordance with the sitting state of the seated person and thus to output the notification vibration having intensity that the seated person can sufficiently perceive.

In the notification apparatus and notification method, the control level determination unit may determine the control level such that the control level is inversely proportional to the value of the signal level difference $\Delta G$.

When the seated person is sitting on the seat in a proper posture, a higher pressure is applied to the cushion. Such a pressure tends to suppress the vibration transmitted to the first signal converter disposed in the cushion. For this reason, the level of the seat vibration signal detected by the first signal converter when the seated person is sitting on the seat in a proper posture tends to become a lower value than that when the seated person is sitting on the seat in an improper posture. On the other hand, when the seated person is sitting on the seat in an improper posture, a lower pressure is applied to the cushion. For this reason, the level of the seat vibration signal detected by the first signal converter tends to become a higher value than that when the seated person is sitting on the seat in a proper posture. Accordingly, when the user is sitting on the seat in a proper posture, the value of the signal level difference $\Delta G$ becomes larger; when the seated person is sitting on the seat in an improper posture, the value of the signal level difference $\Delta G$ becomes smaller.

When the seated person is sitting on the seat in a proper posture, a higher pressure is applied to the cushion and thus the amount of damping of the vibration propagated through the cushion is reduced. Accordingly, the notification vibration is transmitted to the seated person without being greatly damped. On the other hand, when the seated person is sitting on the seat in an improper posture, a lower pressure is applied to the cushion and thus the amount of damping of the vibration propagated through the cushion is increased. Accordingly, the notification vibration is transmitted to the seated person while being damped.

When the seated person is sitting on the seat in a proper posture, that is, when the value of the signal level difference $\Delta G$ is larger, the notification vibration outputted in the seat is transmitted to the seated person without being greatly damped. For this reason, the notification apparatus and notification method set the control level to a smaller value so that the control level is inversely proportional to the value of the signal level difference $\Delta G$ and thus is able to cause the person sitting on the seat to perceive the notification vibration having a proper level.

On the other hand, when the seated person is sitting on the seat in an improper posture, that is, when the value of the signal level difference $\Delta G$ is smaller, the amount of damping of the notification vibration outputted in the seat is increased. For this reason, the notification apparatus and notification method set the control level to a larger value so that the control level is inversely proportional to the value of the signal level difference $\Delta G$ and thus is able to cause the person sitting on the seat to perceive the notification vibration having a proper level.

In the notification apparatus and notification method, when the notification situation detector outputs the notification information, the control level determination unit may maintain a value of the control level determined immediately before the notification information is outputted, and while the notification information is outputted, the notification signal controller may control the level of the notification signal on the basis of the value of the control level maintained by the control level determination unit.

When notification information is outputted, the notification apparatus and notification method maintain the value of the control level determined immediately before the notification information is outputted; while the notification information is outputted, the notification apparatus and notification method control the level of the notification signal on the basis of the value of the maintained control level. Thus, even if notification information is being outputted and the first or second signal converter cannot detect a vibration, the notification apparatus and notification method are able to control the level of the notification signal on the basis of the value of the control level determined immediately before the notification information is outputted and thus to properly control the level of the notification signal regardless of whether notification information is being outputted.

In the notification apparatus and notification method, the first signal converter and the vibration converter may form the same converter, and the converter may convert the vibration into the seat vibration signal and converts the notification signal into the notification vibration.

In the notification apparatus and notification method, the signal converter and vibration converter form the same converter. Thus, the apparatus can be simplified. Since the single converter is able to perform the inverse processes, that is, conversion of an electrical signal into a vibration (vibration output) and conversion of a vibration into an electrical signal (vibration detection), the notification apparatus and notification method are able to properly control the level of the notification signal (notification vibration) to be outputted actually, on the basis of the value of the level of the seat vibration signal.

In the notification apparatus and notification method, the notification aspect determination unit may determine, as the notification aspect, one of a plurality of methods for making a notification, the methods differing from each other in a method for causing the user to perceive the notification, and the notification execution unit may make the notification on the basis of the notification aspect determined by the notification aspect determination unit.

In the notification apparatus and notification method, the notification aspect determination unit determines, as the notification aspect, one of the multiple methods for making a notification, the methods differing from each other in a method for causing the user to perceive a notification, and the notification execution unit makes the notification on the basis of the determined notification aspect. The notification aspect is determined on the basis of the value of the signal level difference $\Delta G$, and the value of the signal level difference $\Delta G$ varies with whether the seated person is sitting on the seat in a proper posture. For this reason, the notification apparatus and notification method determine the notification aspect for causing the user to perceive the notification, on the basis of the value of the signal level difference $\Delta G$ indicating whether the seated person is sitting on the seat in a proper posture and thus are able to use a notification method suitable for the sitting state of the user.

In the notification apparatus and notification method, the notification execution unit may include a vibration output unit configured to output a vibration to make the notification to the user, a notification sound output unit configured to output a notification sound to make the notification to the user, and a notification information display configured to display notification information to make the notification to the user. When the notification aspect determination unit determines a method of causing the user to perceive the notification using a vibration, the vibration output unit may make the notification by outputting the vibration. When the notification aspect determination unit determines a method of causing the user to perceive the notification using a notification sound, the notification sound output unit may make the notification by outputting the notification sound. When the notification aspect determination unit determines a method of causing the user to perceive the notification by displaying notification information, the notification information display may make the notification by displaying the notification information.

The notification apparatus and notification method previously have, as methods for causing the user to perceive the notification, the method of causing the user to perceive the notification tactilely by outputting a vibration, the method of causing the user to perceive the notification auditorily by outputting a notification sound, and the method of causing the user to perceive the notification visually by displaying notification information and make the notification using the determined notification method.

For example, when the seated person is sitting on the seat in an improper posture and the value of the signal level difference $\Delta G$ is small, the user may not perceive a vibration generated in the seat. In such a case, the notification apparatus and notification method make an auditory notification by outputting a notification sound or make a visual notification by displaying notification information and thus is able to make an effective notification to the user.

When noise, vibration, or the like is occurring in the environment surrounding the user, for example, when travel noise, travel sound, or the like is occurring in the traveling vehicle, both the seat vibration signal and input vibration signal may show high level values and thus the signal level difference $\Delta G$ may become a small value. Consequently, the notification apparatus and notification method may not be able to make a sufficient notification to the user using a notification sound or vibration. In this case, the notification apparatus and notification method are able to make a sufficient notification to the user by making a visual notification by displaying notification information.

In the notification apparatus and notification method, the first signal converter may detect a vibration transmitted to the seat in a vehicle during travel of the vehicle and converts the vibration into the seat vibration signal, and the second signal converter may detect a vibration generated in the vehicle during travel of the vehicle and converts the vibration into the input vibration signal.

In the notification apparatus and notification method, the first signal converter detects the vibration transmitted to the seat in the vehicle during travel of the vehicle and converts the vibration into the seat vibration signal, and the second signal converter detects the vibration generated in the vehicle during travel of the vehicle and converts the vibration into the input vibration signal. Thus, the notification apparatus and notification method are able to control the level of the notification signal (notification vibration) properly and quickly in the situation in which the vibration level in the vehicle is more likely to vary due to travel of the vehicle.

Advantageous Effects of Invention

The notification apparatus and notification method according to an embodiment of the present invention, determine the control level using the signal level difference $\Delta G$ whose value varies with whether the user is sitting on the seat in a proper posture and control the level of the notification signal on the basis of the control level. Thus, the notification apparatus and notification method are able to properly control or change the level of the notification vibration in accordance with the sitting state of the seated person and thus to output the notification vibration having intensity that the seated person can sufficiently perceive.

DESCRIPTION OF EMBODIMENTS

Figure 1:
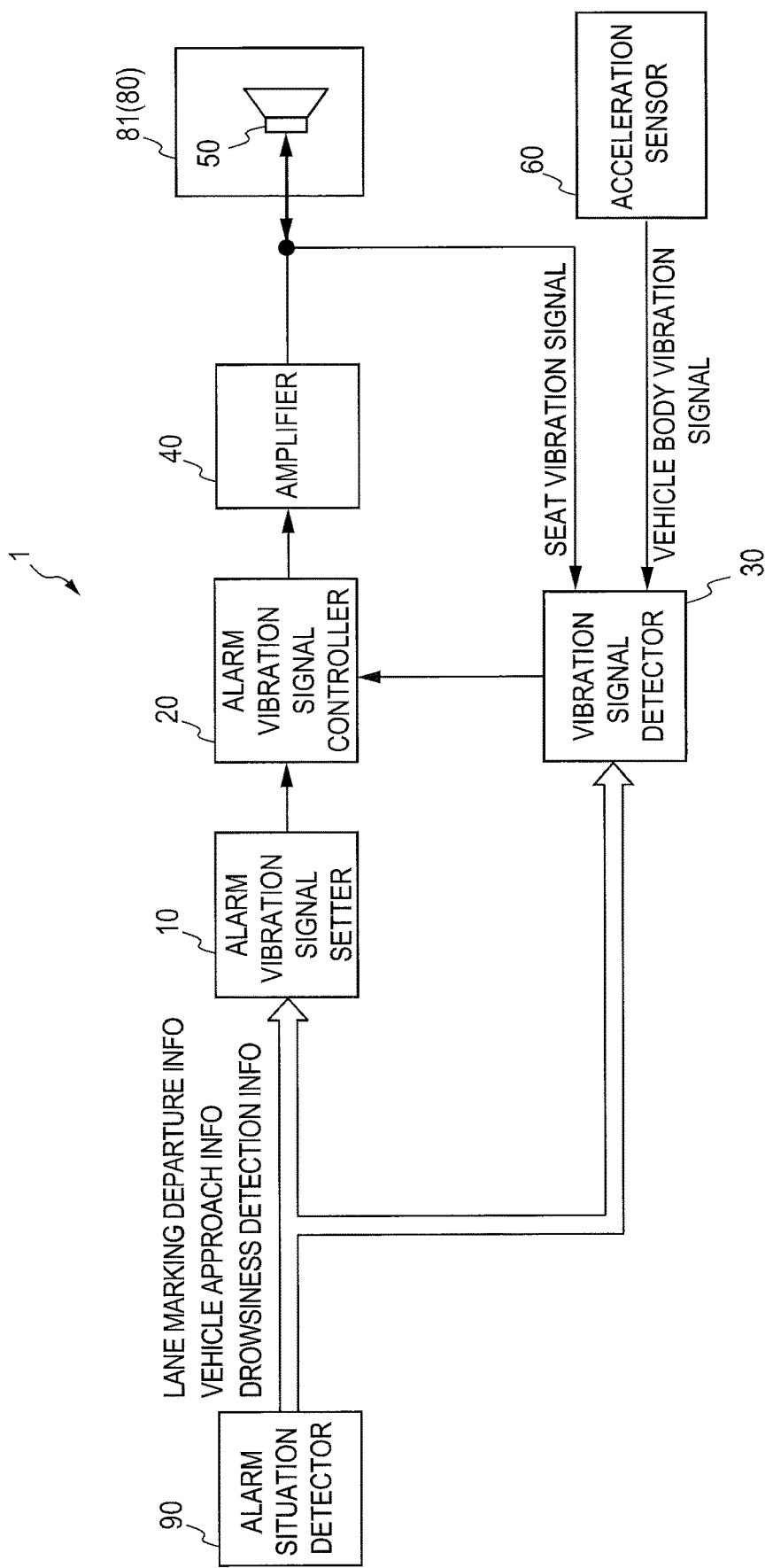
FIG. 1 is a block diagram showing a schematic configuration of a vehicle vibration alarm apparatus according to an embodiment.

A notification apparatus according to the present invention will be described in detail with reference to the drawings. FIG. 1 is a block diagram showing a schematic configuration of a vehicle vibration alarm apparatus, which is an example of the notification apparatus according to the present invention. A vehicle vibration alarm apparatus 1 includes an alarm vibration signal setter (notification signal generator, notification aspect determination unit) 10, an alarm vibration signal controller (notification signal controller, notification aspect determination unit) 20, a vibration signal detector (control level determination unit, level difference calculator, notification aspect determination unit) 30, an amplifier 40, a speaker (first signal converter, notification execution unit, vibration converter, converter, vibration output unit) 50, and an acceleration sensor (second signal converter) 60. The vehicle vibration alarm apparatus 1 is disposed in a vehicle.

Figure 4:
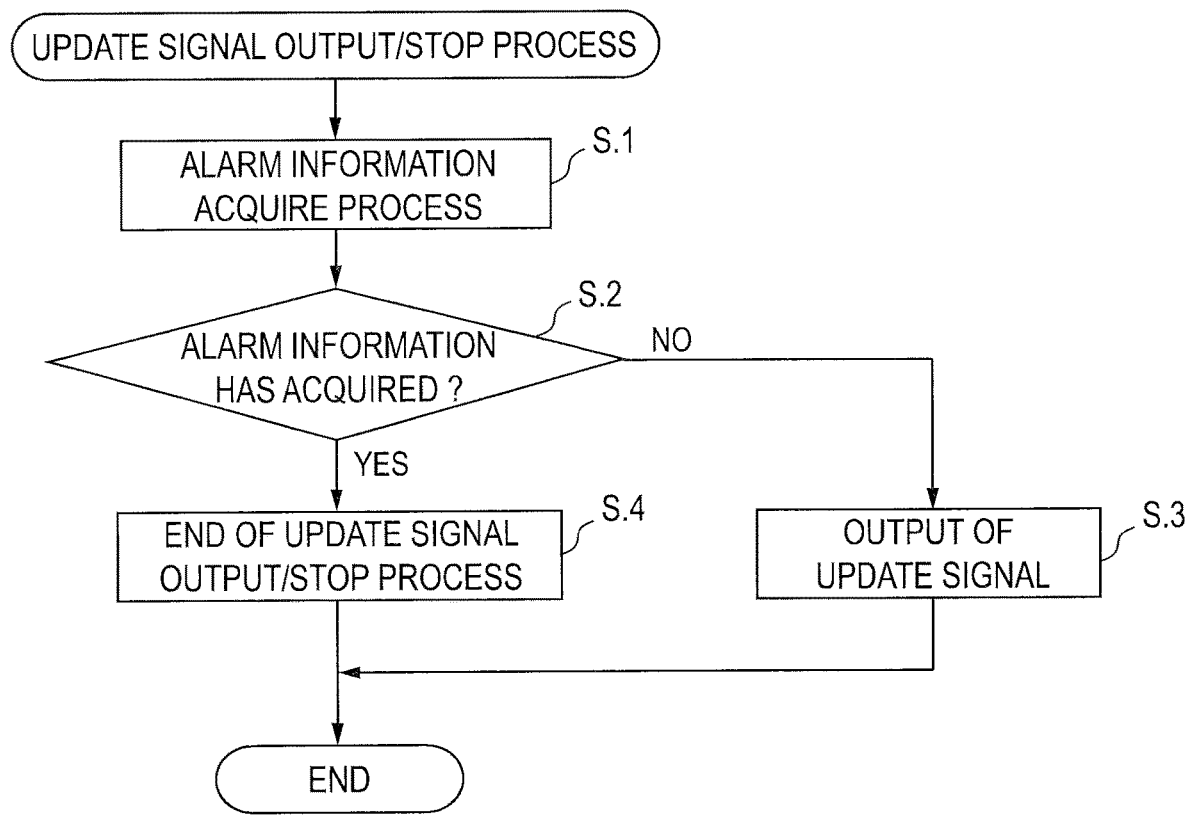
FIG. 4 is a flowchart showing a process performed by an alarm information determination unit according to the present embodiment.

Although not shown, the vehicle vibration alarm apparatus 1 includes a central processing unit (CPU), a read only memory (ROM), and a random access memory (RAM). The ROM stores a program for operating the CPU (for example, a program represented by a flowchart as shown in FIG. 4). Instead of the ROM, there may be used a readable/writable storage medium, such as a hard disk or solid state drive (SSD). The RAM is used as a work area when the CPU performs a process. When the CPU performs a process for making a notification to the user, in accordance with the program, the CPU functions as the alarm vibration signal setter 10, alarm vibration signal controller 20, and vibration signal detector 30. The CPU also functions as a level difference calculator 30a, a control level determination unit 30b, and a notification aspect determination unit 100 (to be discussed later).

Exciter, Amplifier, Acceleration Sensor

Figure 2:
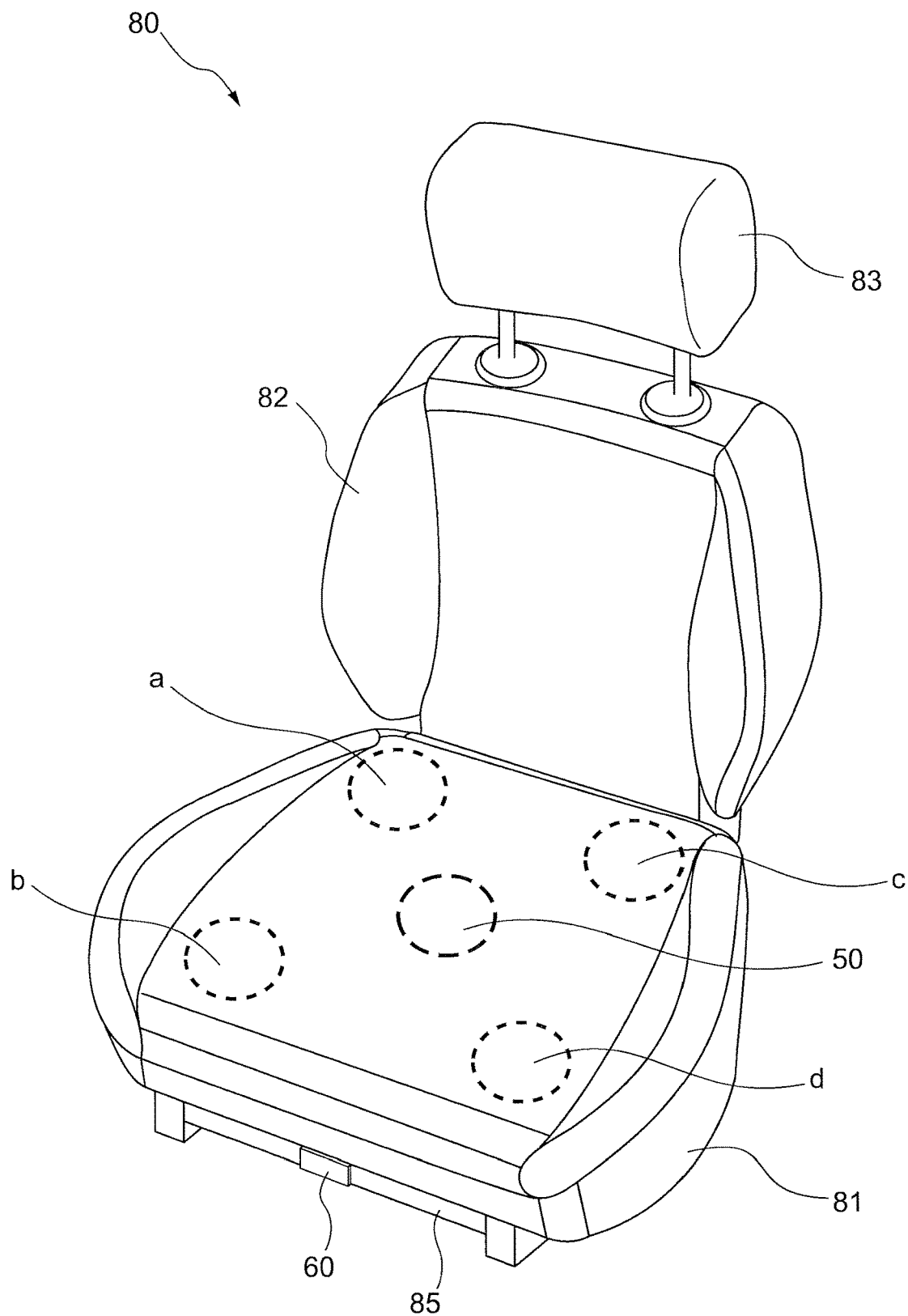
FIG. 2 is a perspective view showing a vehicle seat according to the present embodiment.

The vehicle vibration alarm apparatus 1 according to the present embodiment uses an exciter, which outputs a vibration by vibrating the contact surface, as an example of the speaker. As shown in FIG. 2, the exciter 50 is embedded in the central portion of a cushion forming a seating portion 81 of the vehicle seat (seat) 80. The exciter 50 functions as a vibration output unit (vibration converter) that outputs an alarm vibration (notification vibration) by converting an inputted electrical signal (alarm vibration signal: notification signal) into a vibration.

The exciter 50 also functions as a vibration detector (first signal converter) that detects an in-vehicle vibration transmitted to the vehicle seat 80 as a seat vibration and converts the seat vibration into a seat vibration signal. The exciter 50 outputs the seat vibration signal to the vibration signal detector 30.

The amplifier 40 amplifies the alarm vibration signal, which aims to cause the exciter 50 to output an alarm vibration. The amplifier 40 outputs the amplified alarm vibration signal to the exciter 50 at a low impedance.

The acceleration sensor 60 detects a vehicle body vibration (input vibration) generated in the vehicle. The acceleration sensor 60 is disposed in a position other than the cushion of the seating portion 81, for example, on the frame 85 or the like of the vehicle seat 80. Both the acceleration sensor 60 and exciter 50 detect in-vehicle vibrations. On the other hand, the acceleration sensor 60 differs from the exciter 50 in that it is disposed in a position that is other than the cushion of the seating portion 81 and is not influenced by the sitting state or the like of the user seated on the vehicle seat 80.

The acceleration sensor 60 disposed on the frame 85 or the like of the vehicle seat 80 is able to detect (collect) an in-vehicle vibration (a vehicle body vibration or the like transmitted to the vehicle seat 80), regardless of whether the user is seated, or regardless of whether the user is seated in a proper posture. The acceleration sensor 60 converts the detected vehicle body vibration into a vehicle body vibration signal (input vibration signal) and outputs the vehicle body vibration signal to the vibration signal detector 30.

Vibration Signal Detector 30

When the exciter 50 is not outputting an alarm vibration, the vibration signal detector 30 receives a seat vibration signal from the exciter 50 at a high impedance. By receiving the seat vibration signal at the high impedance, the vibration signal detector 30 is able to reduce the influence of the amplifier 40. Also, when the exciter 50 is not outputting an alarm vibration, the vibration signal detector 30 receives the vehicle body vibration signal from the acceleration sensor 60. If the vibration signal detector 30 receives the seat vibration signal or vehicle body vibration signal when the exciter 50 is outputting an alarm vibration, vibration components of the alarm vibration may be mixed into the seat vibration signal or vehicle body vibration signal and thus the vibration signal detector 30 would have difficulty in properly detecting the level of the seat vibration or vehicle body vibration. For this reason, the vibration signal detector 30 receives the seat vibration signal or vehicle body vibration signal when the exciter 50 is not outputting an alarm vibration.

Figure 3:
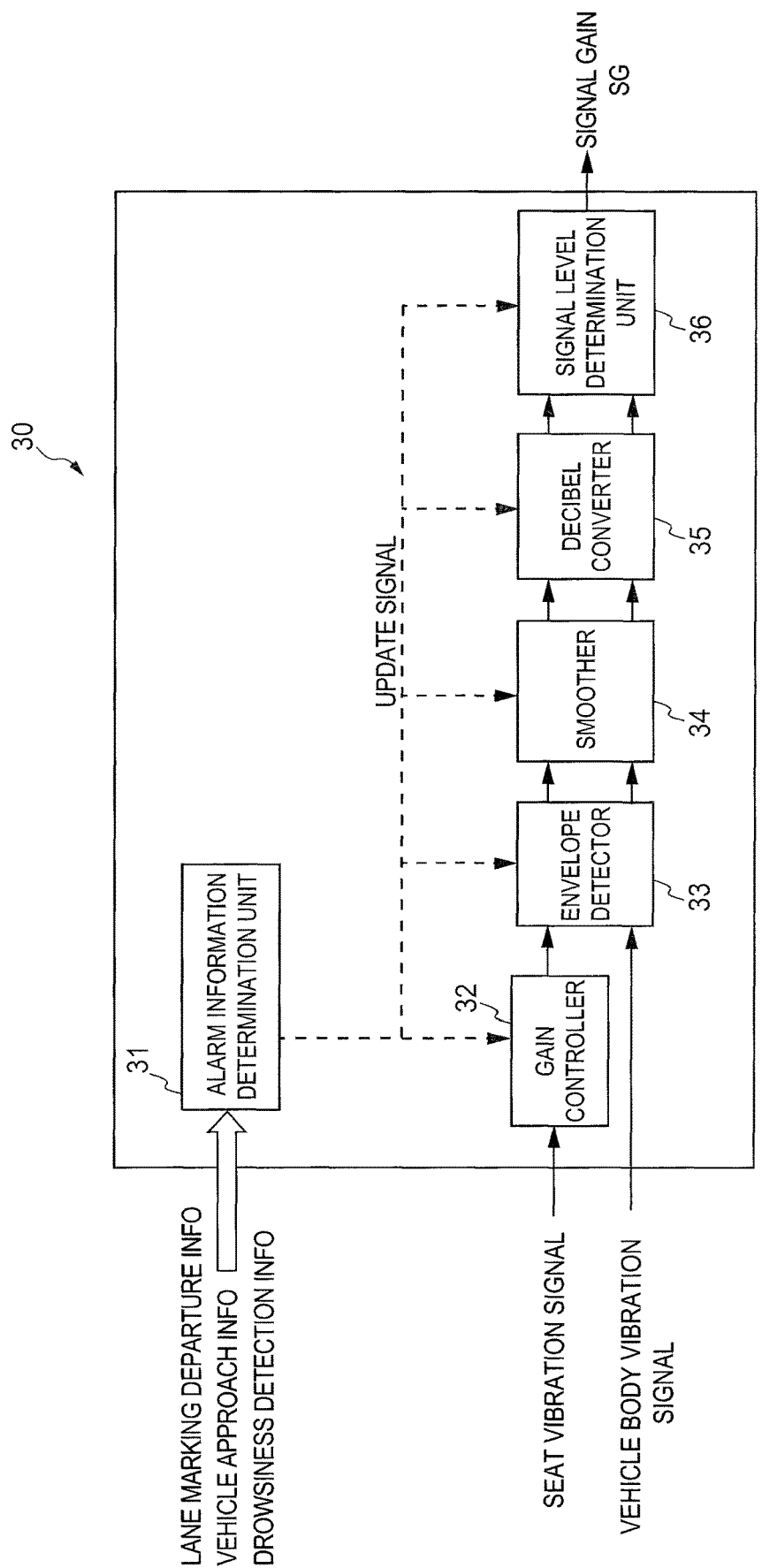
FIG. 3 is a block diagram showing a schematic configuration of a vibration signal detector according to the present embodiment.

FIG. 3 is a block diagram showing a schematic configuration of the vibration signal detector 30. The vibration signal detector 30 includes an alarm information determination unit 31, a gain controller 32, an envelope detector 33, a smoother 34, a decibel converter 35, and a signal level determination unit (control level determination unit, level difference calculator, notification aspect determination unit) 36.

The alarm information determination unit 31 acquires alarm information (notification information). The term "alarm information" refers to information issued by a vehicle-mounted alarm situation detector (electronic control unit: notification situation detector) 90 shown in FIG. 1. For example, the alarm situation detector 90 continuously outputs alarm information, such as lane marking departure information, vehicle approach information, or drowsiness detection information, for a time period corresponding to each alarm situation. For example, if the alarm situation detector 90 detects that the vehicle is traveling on a left or right lane marking, it continuously outputs lane marking departure information while the vehicle travels on the lane marking. When the alarm situation disappears, the alarm situation detector 90 stops outputting alarm information.

Process by Alarm Information Determination Unit

The alarm information determination unit 31 outputs and stops update signals to the gain controller 32, envelope detector 33, smoother 34, decibel converter 35, and signal level determination unit 36.

FIG. 4 is a flowchart showing an update signal output/stop process performed by the alarm information determination unit 31. The alarm information determination unit 31 starts the process of acquiring (sampling process) alarm information from the alarm situation detector 90 (S.1). The alarm information determination unit 31 then determines whether it has acquired alarm information (S.2). If it has not acquired alarm information (No in S.2), the alarm information determination unit 31 outputs update signals to the gain controller 32, envelope detector 33, smoother 34, decibel converter 35, and signal level determination unit 36 (S.3), ending the update signal output/stop process.

If it has acquired alarm information (Yes in S.2), the alarm information determination unit 31 does not output (stops) update signals to the gain controller 32, envelope detector 33, smoother 34, decibel converter 35, and signal level determination unit 36 (S.4), ending the update signal output/stop process. The alarm information determination unit 31 repeatedly performs the update signal output/stop process shown in FIG. 4 at predetermined update timings.

Figure 5:
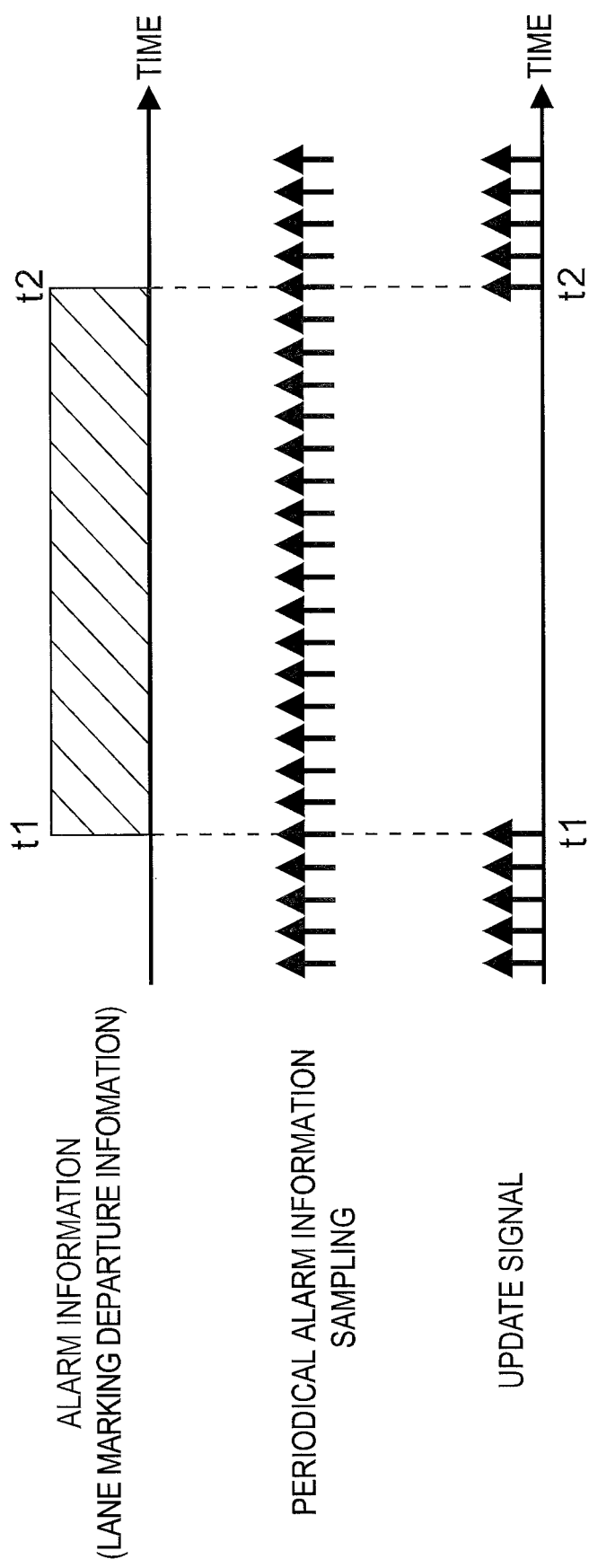
FIG. 5 is a diagram showing the timing at which the alarm information determination unit acquires alarm information, a time period in which alarm information is outputted, and the timings at which the alarm information determination unit outputs update signals.

FIG. 5 is a diagram showing timings at which the alarm information determination unit 31 acquires (samples) alarm information (S.1), a time period in which alarm information is outputted, and timings at which the alarm information determination unit 31 outputs update signals (S.3).

As shown in FIG. 5, the alarm information determination unit 31 periodically acquires alarm information at predetermined update timings. Alarm information is outputted from the alarm situation detector 90 in a time period corresponding to an alarm situation. For this reason, the alarm information determination unit 31 outputs update signals in time periods in which alarm information is not being outputted and at update timings at which the alarm information determination unit 31 acquires (samples) alarm information. In FIG. 5, the alarm information determination unit 31 outputs update signals at update timings until time t1.

The alarm information determination unit 31 does not output update signals (stops update signals) in the period from time t1 to time t2, in which alarm information is outputted. The alarm information determination unit 31 again outputs update signals at time t2, at which output of alarm information is complete, and later update timings.

While the alarm information determination unit 31 periodically outputs update signals, the gain controller 32, envelope detector 33, smoother 34, decibel converter 35, and signal level determination unit 36 perform the processes will be described later. When the alarm information determination unit 31 stops periodical output of update signals, the gain controller 32, envelope detector 33, smoother 34, decibel converter 35, and signal level determination unit 36 maintain data (values) indicating the results (the value of the level of a seat vibration signal, the value of the level of a vehicle body vibration signal, etc.) of processes performed when receiving update signals lastly. While output of update signals is stopped (in the period from time t1 to time t2 shown in FIG. 5), that is, while alarm information is inputted to the alarm information determination unit 31, the gain controller 32, envelope detector 33, smoother 34, decibel converter 35, and signal level determination unit 36 continue the processes on the basis of the maintained data (values).

Gain Controller, Envelope Detector, Smoother, Decibel Converter

The gain controller 32 controls the level of the seat vibration signal received from the exciter 50. The exciter 50 functions as both a vibration output unit (vibration converter) that outputs an alarm vibration and a vibration detector that detects a seat vibration transmitted to the vehicle seat 80. Since there may be a difference between the sensitivity with which the exciter 50 detects a vibration and the sensitivity with which the acceleration sensor 60 disposed solely for detecting a vehicle body vibration detects a vibration, the gain controller 32 controls the level of the seat vibration signal detected by the exciter 50. Thus, when vibrations having the same magnitude are inputted to the exciter 50 and acceleration sensor 60, the gain controller 32 is able to equalize the levels of signals obtained through conversion by the exciter 50 and acceleration sensor 60.

The envelope detector 33 acquires the seat vibration signal from the exciter 50 through the gain controller 32 and detects an envelope of the seat vibration signal. The envelope detector 33 also acquires the vehicle body vibration signal from the acceleration sensor 60 and detects an envelope of the vehicle body vibration signal.

The smoother 34 smooths the respective envelopes of the seat vibration signal and vehicle body vibration signal detected by the envelope detector 33 using a low-pass filter and thus is able to reduce changes in the level of a nonsteady vibration generated when the vehicle passes on a gap or the like of the road surface.

The decibel converter 35 converts the seat vibration signal and vehicle body vibration signal smoothed by the smoother 34 into signals in decibel (decibel signals).

As described above, while the alarm information determination unit 31 periodically outputs update signals, the gain controller 32, envelope detector 33, smoother 34, decibel converter 35, and signal level determination unit 36 perform the respective processes; during a stop of output of update signals, these components perform the processes while maintaining data (values) obtained when receiving update signals lastly; and when input of alarm information to the alarm information determination unit 31 is stopped and the alarm information determination unit 31 resumes output of update signals, the gain controller 32, envelope detector 33, smoother 34, decibel converter 35, and signal level determination unit 36 perform the respective processes on the basis of a seat vibration signal newly received from the exciter 50 and a vehicle body vibration signal newly received from the acceleration sensor 60.

Signal Level Determination Unit

The signal level determination unit 36 obtains the difference between the values of the levels of the seat vibration signal and vehicle body vibration signal obtained by the decibel converter 35 and determines a signal gain SG (control level) for controlling the level of the alarm vibration signal (the level of the alarm vibration), on the basis of the obtained difference.

Figure 6:
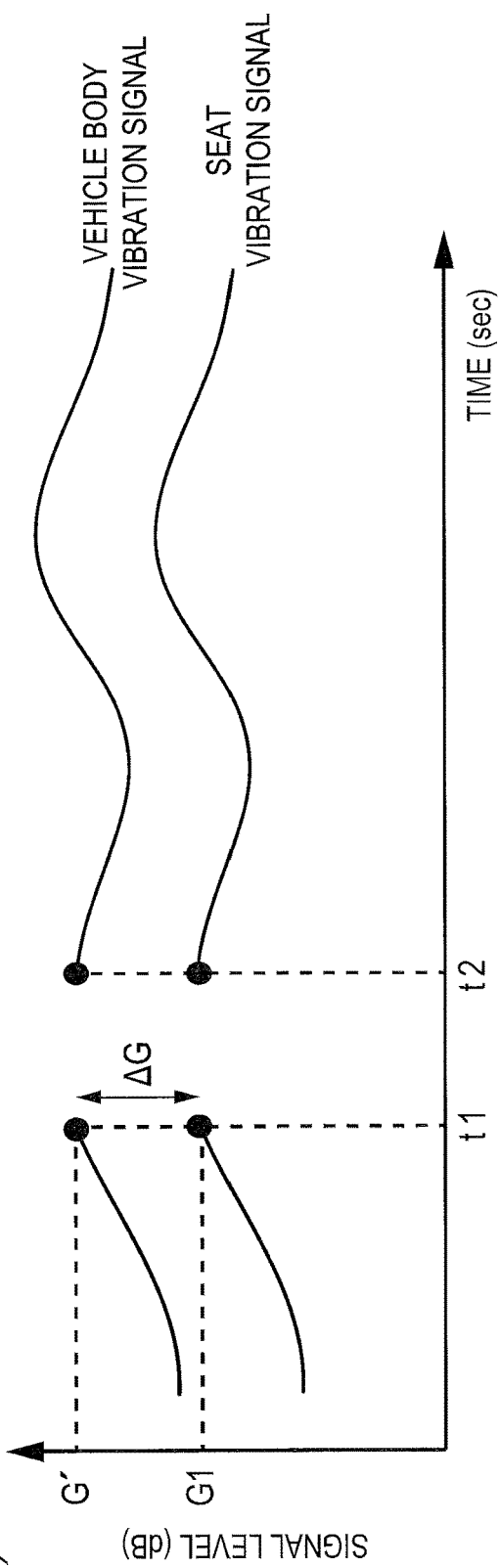
FIG. 6(a) is a graph showing level characteristics of a seat vibration signal and level characteristics of a vehicle body vibration signal in a case in which the user is sitting on the vehicle seat in an improper posture and FIG. 6(b) is a graph showing level characteristics of a seat vibration signal and level characteristics of a vehicle body vibration signal in a case in which the user is sitting on the vehicle seat in a proper posture.
Figure 6:
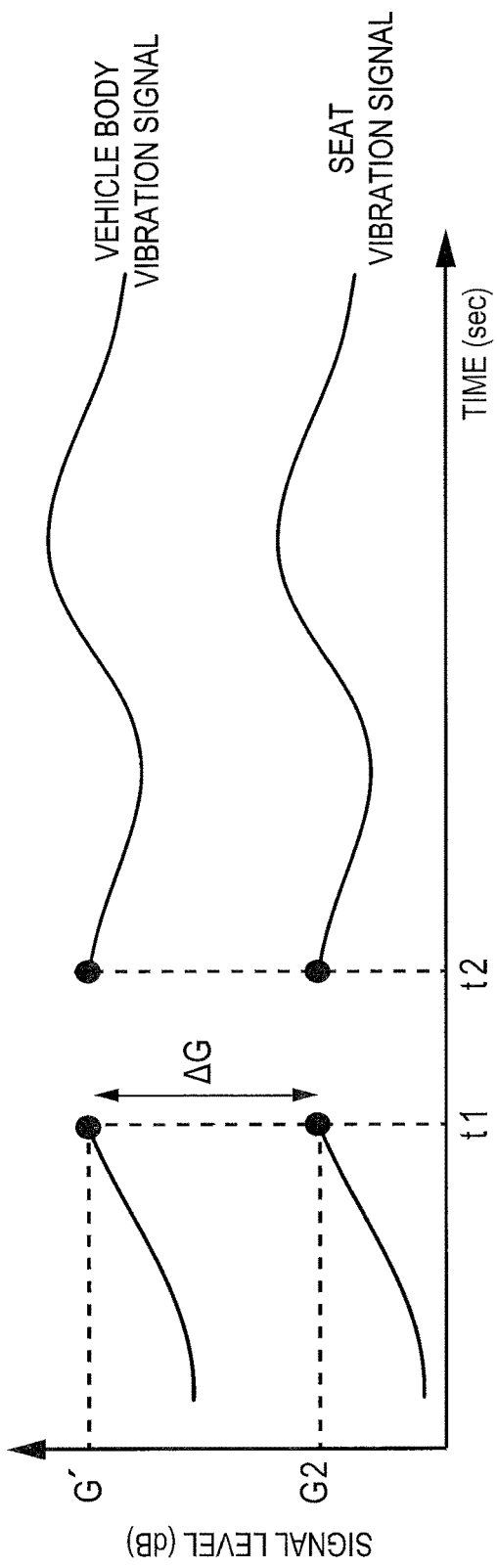

FIGS. 6(*a*) and 6(*b*) are graphs showing level characteristics of the seat vibration signal (temporal changes in the signal level) and level characteristics of the vehicle body vibration signal (temporal changes in the signal level) obtained from the decibel converter 35 by the signal level determination unit 36. FIG. 6(*a*) shows a case in which the user is sitting on the vehicle seat 80 in an improper posture, and FIG. 6(*b*) shows a case in which the user is sitting on the vehicle seat 80 in a proper posture.

Time t1 and time t2 shown in FIGS. 6(*a*) and 6(*b*) correspond to time t1 and time t2, which are the update timings of update signals shown in FIG. 5. Time t1 represents a timing immediately before the alarm information determination unit 31 receives alarm information. The value of the level of the vehicle body vibration signal obtained from the decibel converter 35 by the signal level determination unit 36 at time t1 is defined as G' (dB).

The time at which the alarm information determination unit 31 outputs update signals subsequent to time t1 is time t2. The value of the level of the vehicle body vibration signal is held at G' in a time period from time t1 until immediately before time t2. When the alarm information determination unit 31 outputs update signals at time t2, the decibel converter 35 obtains the value of the level of a new vehicle body vibration signal and outputs it to the signal level determination unit 36.

The value of the level of the seat vibration signal acquired from the decibel converter 35 by the signal level determination unit 36 at time t1 in a case in which the user is sitting on the vehicle seat 80 in an improper posture (FIG. 6(*a*)) is defined as G1 (dB). The value of the level of the seat vibration signal acquired at time t1 in a case in which the user is sitting on the vehicle seat 80 in a proper posture (FIG. 6(*b*)) is defined as G2 (dB). In both cases, as with the vehicle body vibration signal, the value of the level of the seat vibration signal is held at G1 or G2 in a time period from time t1 until immediately before time t2. When the alarm information determination unit 31 outputs update signals at time t2, the decibel converter 35 obtains the value of the level of a new seat vibration signal and outputs it to the signal level determination unit 36.

A comparison is made between the level G1 (dB) of the seat vibration signal in the case in which the user is sitting on the vehicle seat 80 in an improper posture and the level G2 (dB) of the seat vibration signal in the case in which the user is sitting on the vehicle seat 80 in a proper posture. In the case in which the user is sitting on the vehicle seat 80 in a proper posture (FIG. 6(*b*)), a higher pressure is applied to the cushion of the seating portion 81. The higher pressure on the cushion tends to suppress a vibration transmitted from the road surface or the like to the exciter 50 through the cushion of the seating portion 81, for example, during travel of the vehicle and to reduce the level of the seat vibration signal detected by the exciter 50. On the other hand, in the case in which the user is sitting on the vehicle seat 80 in an improper posture (FIG. 6(*a*)), a lower pressure is applied to the cushion of the seating portion 81. The lower pressure on the cushion tends not to suppress a vibration transmitted from the road surface or the like to the exciter 50 through the cushion of the seating portion 81, for example, during travel of the vehicle compared to when the higher pressure is applied to the cushion and thus to relatively increase the level of the seat vibration signal detected by the exciter 50.

Since the acceleration sensor 60 is disposed on the frame or the like of the vehicle seat 80, the level G' (dB) of the vehicle body vibration signal detected by the acceleration sensor 60 is not influenced by whether the user is seated in a proper posture.

Next, there is considered the value (signal level difference) ΔG obtained by subtracting the level G1 (dB) or G2 (dB) of the seat vibration signal from the level G' (dB) of the vehicle body vibration signal. As shown in FIGS. 6(*a*) and 6(*b*), the level G1 of the seat vibration signal in the case in which the user is sitting on the vehicle seat 80 in an improper posture (FIG. 6(*a*)) is higher than the level G2 of the seat vibration signal in the case in which the user is sitting on the vehicle seat 80 in a proper posture (FIG. 6(*b*)). The level G' (dB) of the vehicle body vibration signal detected by the acceleration sensor 60 is not influenced by whether the user is seated in a proper posture. Accordingly, the signal level difference ΔG obtained by subtracting the value of the level G1 or G2 of the seat vibration signal from the level G' of the vehicle body vibration signal is G'−G1<G'−G2. That is, the signal level difference ΔG=G'−G1 in the case in which the user is sitting on the vehicle seat 80 in an improper posture is smaller than the signal level difference ΔG=G'−G2 in the case in which the user is sitting on the vehicle seat 80 in a proper posture.

For this reason, by controlling the level of the alarm vibration signal in accordance with the signal level difference ΔG, the signal level determination unit 36 is able to control the level of the alarm vibration in accordance with the sitting state of the user. That is, the signal level determination unit 36 is able to control a variation in the perceptibility of the alarm vibration that can be caused by the difference between the sitting postures of the user so that the alarm vibration is perceived with equal intensity regardless of the sitting state.

The signal level determination unit 36 calculates the signal level difference ΔG at time t1 and time t2 by subtracting the value of the level of the seat vibration signal from the value of the level of the vehicle body vibration signal and determines the signal gain SG (control level) of the alarm vibration signal on the basis of the calculated signal level difference ΔG.

Figure 7:
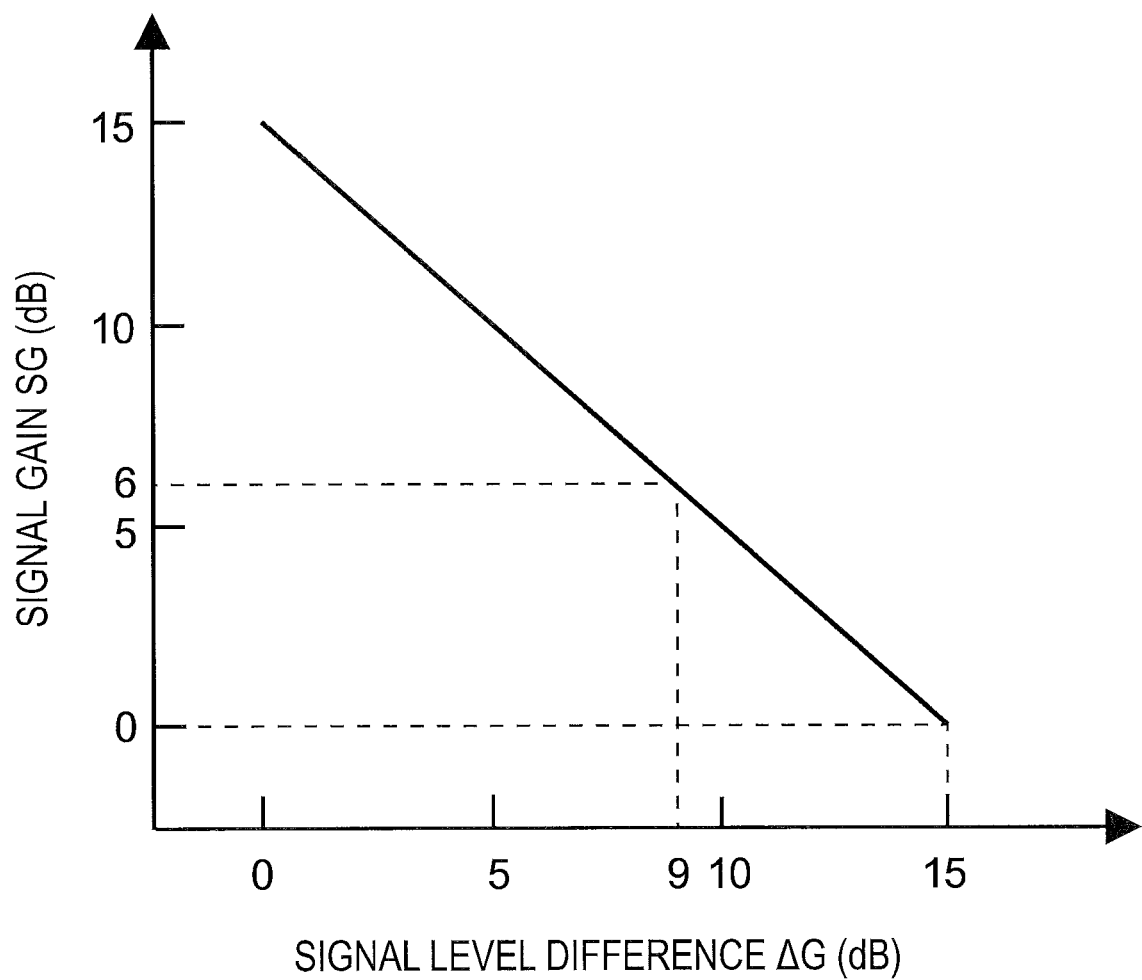
FIG. 7 is a graph showing the correspondence between a signal level difference ΔG and a signal gain SG.

FIG. 7 is a graph showing the correspondence between the signal level difference ΔG and signal gain SG. As described above, when the user is sitting on the vehicle seat 80 in an improper posture, the value of the signal level difference ΔG is smaller (FIG. 6(*a*)). In this case, a lower pressure is applied to the cushion of the seating portion 81 and thus the amount of damping of the vibration propagated through the cushion is increased. As a result, the level of the alarm vibration perceived by the user through the exciter 50 becomes a lower value. For this reason, when the value of the signal level difference ΔG is smaller, the signal level determination unit 36 sets the level of the alarm vibration signal to a higher value and thus increases the level of the alarm vibration perceived by the user.

On the other hand, as described above, when the user is sitting on the vehicle seat 80 in a proper posture, the value of the signal level difference ΔG is larger (FIG. 6(*b*)). In this case, a higher pressure is applied to the cushion of the seating portion 81 and thus the amount of damping of the vibration propagated through the cushion is reduced. Accordingly, the level of the alarm vibration perceived by the user through the exciter 50 becomes a relatively high value. For this reason, when the value of the signal level difference ΔG is larger, the signal level determination unit 36 sets the level of the alarm vibration signal to a lower value and thus prevents the level of the alarm vibration perceived by the user from becoming too high.

As shown in FIG. 7, setting the value of the signal gain SG of the alarm vibration signal such that the value of the signal gain SG is inversely proportional to the value of the signal level difference ΔG is equivalent to controlling the signal gain SG in accordance with the pressure applied to the cushion. Accordingly, when the user is sitting on the vehicle seat 80 in an improper posture, the gain SG of the alarm vibration signal may be increased; when the user is sitting on the vehicle seat 80 in a proper posture, the gain SG of the alarm vibration signal may be reduced.

The signal level determination unit 36 outputs the determined gain SG of the alarm vibration signal to the alarm vibration signal controller 20.

Alarm Vibration Signal Setter

Figure 8:
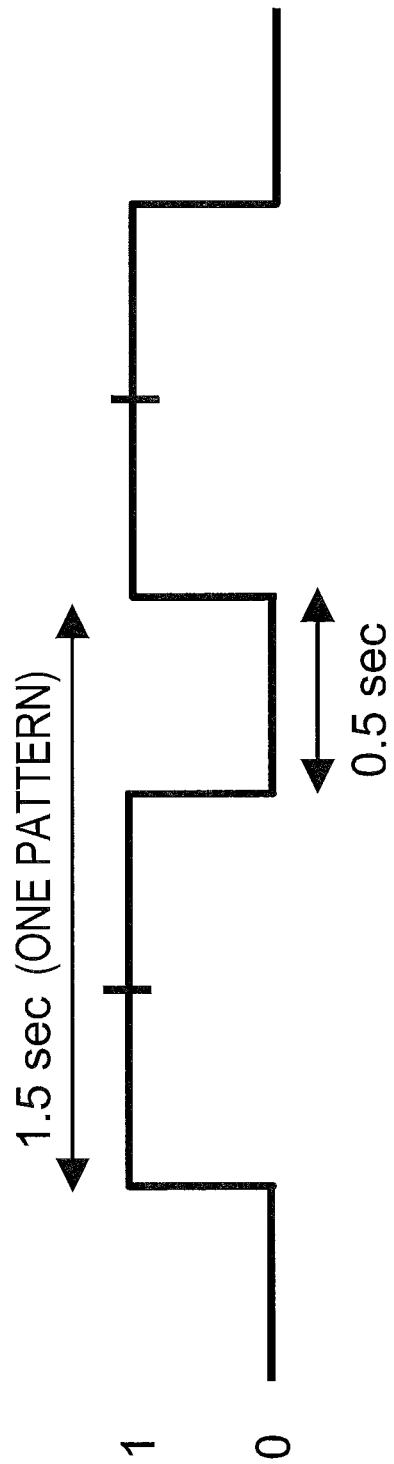
FIG. 8 is a diagram showing vibration patterns that an alarm vibration signal setter sets when receiving lane marking departure information.

The alarm vibration signal setter 10 generates a vibration pattern signal on the basis of alarm information acquired from the alarm situation detector 90. FIG. 8 is a diagram showing vibration patterns that the alarm vibration signal setter 10 sets when receiving lane marking departure information as alarm information. The vibration patterns set on the basis of the lane marking departure information are each a signal consisting of three cycles that is each 0.5 sec. Specifically, as shown in FIG. 8, one vibration pattern is generated by setting the signal level to ON (signal level 1 in FIG. 8) continuously in two cycles and then setting the signal level to OFF (signal level 0 in FIG. 8) in one cycle. Accordingly, one vibration pattern has a length of 1.5 sec. The alarm vibration signal setter 10 continuously generates a vibration pattern signal consisting of the vibration patterns shown in FIG. 8 while receiving alarm information from the alarm situation detector 90. The alarm vibration signal setter 10 outputs the generated vibration pattern signal to the alarm vibration signal controller 20.

Alarm Vibration Signal Controller

The alarm vibration signal controller 20 generates an alarm vibration signal on the basis of the vibration pattern signal acquired from the alarm vibration signal setter 10 and the value of the signal gain SG acquired from the vibration signal detector 30.

Figure 9:
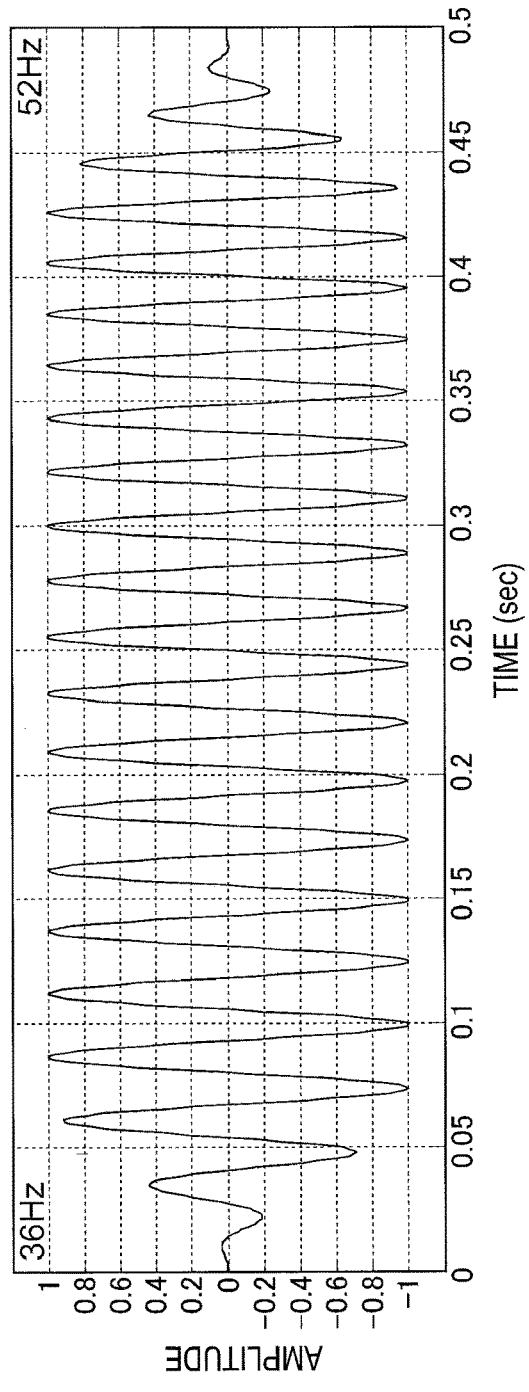
FIG. 9(a) is a graph showing amplitude characteristics of a sweep signal corresponding to one cycle and FIG. 9(b) is a graph showing amplitude characteristics of an alarm vibration signal based on the lane marking departure information.
Figure 9:
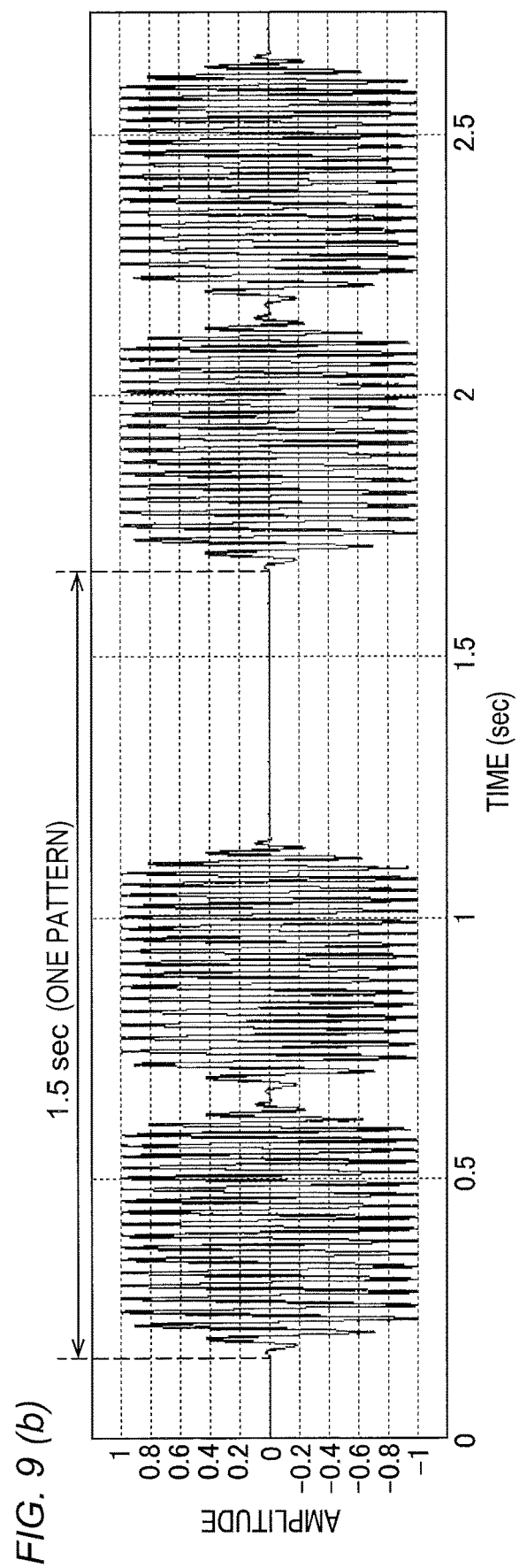

FIG. 9(*a*) is a graph showing amplitude characteristics (waveform) of a sweep signal corresponding to one cycle (0.5 sec). The sweep signal shown in FIG. 9(*a*) is a signal obtained by continuously changing (sweeping) the frequency in a frequency range having a center frequency of 44 Hz, a low band-side lower limit frequency of 36 Hz, and a high band-side upper limit frequency of 52 Hz. The reference amplitude value of the sweep signal is set to 1.

The alarm vibration signal controller 20 then generates an alarm vibration signal whose vibration level is set to ON or OFF, by combining such one-cycle sweep signals in accordance with the vibration patterns of the vibration pattern signal. FIG. 9(*b*) shows amplitude characteristics of the alarm vibration signal generated based on the lane marking departure information. As shown in FIG. 9(*b*), the alarm vibration signal consists of repeatedly generated signals each having one pattern of 1.5 sec. The reference amplitude value of the alarm vibration signal is also set to 1.

The alarm vibration signal controller 20 also controls the level of the alarm vibration signal shown in FIG. 9(*b*) on the basis of the signal gain SG. For example, when the user is sitting on the vehicle seat 80 in a proper posture and when the signal level difference ΔG is 15 dB, the value of the signal gain SG becomes 0 dB as shown in FIG. 7. In this case, the alarm vibration signal controller 20 does not change the amplitude of the alarm vibration signal shown in FIG. 9(*b*).

For example, when the user who has sat in a proper posture changes his or her sitting posture and the detected signal level difference ΔG is changed to 9 dB, the value of the signal gain SG is changed to 6 dB, as shown in FIG. 7. In this case, the alarm vibration signal controller 20 changes the amplitude of the alarm vibration signal to a value that is twice the reference amplitude value shown in FIG. 9(*b*). The reason why when the signal gain SG is 6 dB, the amplitude of the alarm vibration signal is doubled is that increasing the level of the alarm vibration signal to 6 dB is equivalent to doubling the amplitude value.

The alarm vibration signal controller 20 continuously outputs the alarm vibration signal thus generated to the amplifier 40 while the alarm vibration signal setter 10 receives alarm information. The amplifier 40 amplifies the amplitude (level) of the alarm vibration signal, and the exciter 50 converts the resulting alarm vibration signal into an alarm vibration and outputs the alarm vibration in the vehicle seat 80 as a vibration.

As described above, the vehicle vibration alarm apparatus 1 according to the present embodiment uses the exciter 50 embedded in the cushion of the seating portion 81 as a vibration detector, and the exciter 50 detects a vibration of the seat and obtains a seat vibration signal. The vehicle vibration alarm apparatus 1 is able to determine the sitting state of the user on the basis of the level of the seat vibration signal obtained by the exciter 50.

The vehicle vibration alarm apparatus 1 also obtains a vehicle body vibration signal by detecting a vehicle body vibration using the acceleration sensor 60 disposed on the frame 85 or the like of the vehicle seat 80 so that the acceleration sensor 60 is not influenced by the sitting state of the user, calculates the signal level difference ΔG by subtracting the level of the seat vibration signal obtained using the exciter 50 from the level of the vehicle body vibration signal obtained using the acceleration sensor 60, and determines the signal gain SG, which aims to control the level of the alarm vibration signal, in accordance with the value of the signal level difference ΔG. Since the value of the signal gain SG is determined so as be inversely proportional to the value of the signal level difference ΔG, the value of the signal gain SG is determined so as to be reduced as the value of the signal level difference ΔG is increased.

When the signal level difference ΔG is larger, that is, when the user is sitting on the vehicle seat 80 in a proper posture, a higher pressure is applied to the cushion of the seating portion 81. Accordingly, the level of an alarm vibration perceived by the user through the exciter 50 become a relatively high value. In this case, even if the vehicle vibration alarm apparatus 1 outputs an alarm vibration having a relatively low level from the exciter 50 by setting the value of the signal gain SG to a relatively low value, it is able to cause the user to perceive the alarm vibration as one having a sufficient magnitude.

On the other hand, when the signal level difference ΔG is smaller, that is, when the user is sitting on the vehicle seat 80 in an improper posture, a lower pressure is applied to the cushion of the seating portion 81. Accordingly, the vehicle vibration alarm apparatus 1 would have difficulty in causing the user to perceive an alarm vibration having a sufficient magnitude unless the level of the alarm vibration perceived by the seated user through the exciter 50 is set to a relatively high value. In this case, the vehicle vibration alarm apparatus 1 sets the value of the signal gain SG to a larger value and thus is able to output an alarm vibration having a sufficiently high level from the exciter 50 and to cause the user to reliably perceive the alarm vibration.

As seen above, the vehicle vibration alarm apparatus 1 determines the signal gain SG in accordance with the signal level difference ΔG, controls the level of the alarm vibration signal on the basis of the signal gain SG, and outputs the alarm vibration from the exciter 50. Thus, the vehicle vibration alarm apparatus 1 is able to change or control the level of the alarm vibration signal in accordance with the sitting state of the user and to improve the perceptibility of the alarm.

The alarm situation detector 90 outputs alarm information to the vehicle vibration alarm apparatus 1. Even when the vehicle vibration alarm apparatus 1 is not acquiring a seat vibration signal from the exciter 50, it is able to calculate the signal level difference ΔG on the basis of the value of the level of the immediately preceding seat vibration signal and the value of the level of the immediately preceding vehicle body vibration signal and to set the level of an alarm vibration signal. Thus, the vehicle vibration alarm apparatus 1 is able to properly set the level of an alarm vibration signal even immediately after the alarm situation detector 90 has stopped outputting alarm information.

In the vehicle vibration alarm apparatus 1 according to the present embodiment, the single exciter 50 performs the inverse processes: conversion of an electrical signal into a vibration (vibration output) and conversion of a vibration into an electrical signal (vibration detection). Thus, the apparatus can be simplified.

The notification apparatus and notification method according to the embodiment of the present invention have been described in detail by way of example. However, the notification apparatus and notification method according to the embodiment of the present invention is not limited to the example described in the embodiment.

While, in the above-mentioned vehicle vibration alarm apparatus 1, the exciter 50 is disposed in the central portion of the cushion forming the seating portion 81 of the vehicle seat 80, the exciter 50 need not be disposed in the seating portion 81 and may be disposed in the backrest 82 or headrest 83 shown in FIG. 2. Note that when the user is sitting on the vehicle seat 80, the backrest 82 or headrest 83 is located near the back of the user and therefore a high pressure (weight, etc.) is not always applied thereto, unlike when the exciter 50 is disposed in the seating portion 81. For this reason, the vibration signal detector 30 may previously define a case in which the signal level difference ΔG obtained by subtracting the value of the level of the seat vibration signal detected by the exciter 50 from the value of the level of the vehicle body vibration signal detected by the acceleration sensor 60 is a predetermined value or less (e.g., 3 dB), as a state in which almost no weight is being applied to the backrest 82 and, when this case occurs, may determine that the user is sitting in an improper posture.

If the exciter 50 is disposed in the backrest 82 or the like, the user may not be able to perceive an alarm vibration outputted from the exciter 50. For this reason, in addition to (or instead of) the exciter 50, which outputs an alarm vibration, there may be disposed alarm means that alarms the user auditorily or visually by issuing an alarm sound or displaying an alarm indication.

For example, it is possible to previously prepare multiple notification means that make a notification to the user, to determine one of the notification means in accordance with the magnitude of the obtained signal level difference ΔG, and to make a notification using the determined notification means.

Figure 10:
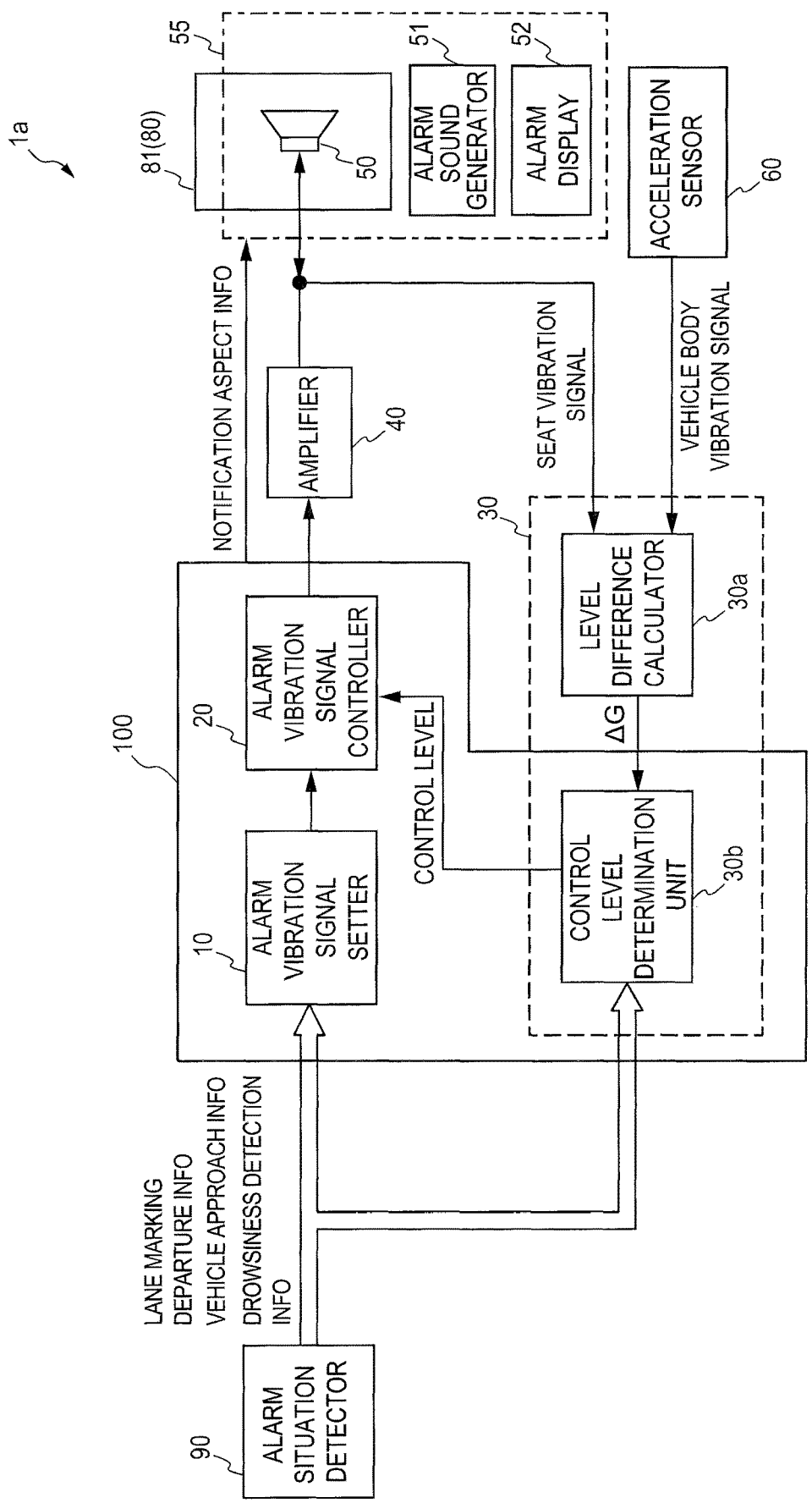
FIG. 10 is a block diagram showing a schematic configuration of another vehicle vibration alarm apparatus according to the present embodiment.

FIG. 10 is a diagram showing a schematic configuration of a vehicle vibration alarm apparatus 1a that determines one of multiple notification means in accordance with the magnitude of the signal level difference ΔG and makes a notification using the determined notification means. Elements having the same functions as the functional elements of the vehicle vibration alarm apparatus 1 shown in FIG. 1, of the vehicle vibration alarm apparatus 1a are assigned the same reference signs and will not be described in detail.

In the above-mentioned vehicle vibration alarm apparatus 1, the signal level determination unit 36 of the vibration signal detector 30 performs the two processes: the process of obtaining the difference between the value of the level of the seat vibration signal and the value of the level of the vehicle body vibration signal as the signal level difference ΔG (level difference calculation process) and the process of determining the signal gain SG (control level), which aims to control the level of the alarm vibration signal (the level of the alarm vibration), on the basis of the value of the signal level difference ΔG (control level determination process). In the vehicle vibration alarm apparatus 1a shown in FIG. 10, a vibration signal detector 30 includes a level difference calculator (level difference calculator) 30a that obtains the signal level difference ΔG and a control level determination unit (control level determination unit) 30b that determines the signal gain SG (control level) on the basis of the value of the signal level difference ΔG.

As shown in FIG. 10, the vehicle vibration alarm apparatus 1a includes a notification execution unit 55 that makes a notification to the user. The notification execution unit 55 includes multiple alarm devices (notification means). Specifically, the notification execution unit 55 includes an exciter (vibration output unit, vibration generator) 50 that makes a tactile notification (alarm) to the user by outputting a vibration, an alarm sound generator (notification sound output unit) 51 that makes an auditory notification (alarm) to the user by outputting an alarm sound (notification sound), and an alarm display (notification information display) 52 that makes a visual notification (alarm) to the user by displaying notification information.

As shown in FIG. 10, the vehicle vibration alarm apparatus 1a also includes a notification aspect determination unit 100 that determines at least one of the exciter 50, alarm sound generator 51, and alarm display 52 as a "notification aspect" on the basis of the value of the signal level difference ΔG obtained by the level difference calculator 30a. The notification aspect determination unit 100 outputs the notification aspect determined on the basis of the value of the signal level difference ΔG to the notification execution unit 55 as notification aspect information. The notification execution unit 55 determines the alarm device on the basis of the notification aspect information and makes a notification to the user. As shown in FIG. 10, the notification aspect determination unit 100 also includes an alarm vibration signal setter 10, an alarm vibration signal controller 20, and the control level determination unit 30b.

For example, when the signal level difference ΔG obtained by the level difference calculator 30a is large, it can be determined that the user is sitting on a vehicle seat 80 in a proper posture, as described above. In this case, the notification aspect determination unit 100 determines the exciter 50 as a notification aspect and outputs notification aspect information to the notification execution unit 55. The notification execution unit 55 determines the exciter 50 as an alarm device on the basis of the notification aspect information and causes the user to perceive an alarm vibration by outputting the alarm vibration from the exciter 50. Outputting the alarm vibration to the user using the exciter (vibration generator) 50 as an alarm device can become an effective notification method.

However, when the signal level difference $\Delta G$ is small, it can be determined that the user is sitting on the vehicle seat 80 in an improper posture. In this case, even if an alarm vibration is outputted using the exciter (vibration generator) 50 as an alarm device, the user may not be able to perceive the alarm vibration as one having a sufficient magnitude. Also, as described above, if the exciter 50 is disposed in the backrest 82, headrest 83, or the like, a high pressure (weight, etc.) is not always applied to the backrest 82 or the like and therefore the signal level difference $\Delta G$ tends to be small. As seen above, even if an alarm vibration is outputted using the exciter (vibration generator) 50 as an alarm device, the user may not be able to perceive the alarm vibration as one having a sufficient magnitude.

For this reason, when the signal level difference $\Delta G$ is small, the notification aspect determination unit 100 determines the alarm sound generator 51 as a notification aspect and outputs notification aspect information to the notification execution unit 55. The notification execution unit 55 determines the alarm sound generator 51 as an alarm device on the basis of the notification aspect information and makes an alarm (notification) to the user by outputting an alarm sound from the alarm sound generator 51. That is, when the signal level difference $\Delta G$ is small, the notification execution unit 55 outputs a sound using the alarm sound generator 51, such as a speaker, as an alarm device rather than using the exciter (vibration generator) 50 and thus is able to make a sufficient notification to the user. Thus, even if the user is not able to sufficiently perceive a vibration-based alarm (alarm vibration), the notification execution unit 55 is able to make an effective notification to the user using a sound-based alarm (alarm sound).

When the travel vibration, travel sound, or the like in the vehicle is large, even if the exciter (vibration generator) 50 or alarm sound generator 51 is used as an alarm device, a sufficient notification may not be made to the user. Also, when the travel vibration, travel sound, or the like in the vehicle is large, both the seat vibration signal and vehicle body vibration signal may show high level values and thus the signal level difference $\Delta G$ may become a small value. In this case, the notification aspect determination unit 100 determines the alarm display 52 as a notification aspect and outputs notification aspect information to the notification execution unit 55. The notification execution unit 55 determines the alarm display 52 as an alarm device on the basis of the notification aspect information and gives a visual alarm (notification) to the user using the alarm display 52. Thus, even if a sufficient notification cannot be made to the user using an alarm sound or alarm vibration, the notification execution unit 55 is able to make a sufficient notification to the user using a visual representation.

As seen above, the vehicle vibration alarm apparatus 1a includes the multiple alarm devices (exciter (vibration generator) 50, alarm sound generator 51, and alarm display 52), determines at least one of the alarm devices in accordance with the signal level difference $\Delta G$, and makes a notification to the user using the determined alarm device. Thus, the vehicle vibration alarm apparatus 1a is able to determine the most suitable alarm device in accordance with the sitting state of the user or the state in the vehicle (the presence or absence of travel sounds or travel vibrations, etc.) and to make an effective notification to the user.

The multiple alarm devices may be devices that differ from each other in a method for causing the user to perceive a notification. For example, the multiple alarm devices may be devices that make a notification through the different senses (five senses) of humans, such as a vibration generator that makes a notification (alarm vibration) through the tactile sense, an alarm sound generator that makes a notification (alarm sound) through the auditory sense, and an alarm display that makes a notification (alarm indication) through the visual sense, as described above.

The multiple alarm devices may also be multiple devices that use the same method for causing the user to perceive a notification. For example, the multiple alarm devices may be two vibration generators: a first vibration generator disposed in the vehicle seat 80 and a second vibration generator disposed in the steering wheel or the like. When the signal level difference $\Delta G$ is large, it can be determined that the user is sitting on the vehicle seat 80 in a proper posture. For this reason, by outputting a vibration from the first vibration generator in the seat, a notification can be made to the user. Also, when the signal level difference $\Delta G$ is small, it can be determined that the user is sitting on the vehicle seat 80 in an improper posture. For this reason, it is not easy to cause the user to perceive a vibration on the seat. In this case, by outputting a vibration from the second vibration generator in the steering wheel, a notification can be made to the user.

Even if the number of alarm devices is one, a notification is made using substantially multiple notification aspects by changing a notification made by the alarm device in accordance with the signal level difference $\Delta G$. For example, the vehicle vibration alarm apparatus 1 according to the present embodiment determines the signal gain SG in accordance with the signal level difference $\Delta G$, controls the level of the alarm vibration signal on the basis of the signal gain SG, and outputs the alarm vibration from the exciter 50. When the level of the alarm vibration signal is changed or controlled in accordance with the signal level difference $\Delta G$, the magnitude of an alarm vibration to be outputted is changed in accordance with the signal level difference $\Delta G$. For this reason, the vehicle vibration alarm apparatus 1 according to the present embodiment is one of the cases in which the notification aspect is determined in accordance with the signal level difference $\Delta G$ and then a notification is made. The vehicle vibration alarm apparatus 1a that includes the multiple alarm devices, determines an alarm device in accordance with the signal level difference $\Delta G$, and then makes a notification is also one of the cases in which the notification aspect is determined in accordance with the signal level difference $\Delta G$ and then a notification is made.

In the above-mentioned vehicle vibration alarm apparatuses 1 and 1a according to the present embodiment, the single exciter 50 is disposed in the central portion of the seating portion 81. However, the number of exciters 50 need not necessarily be one and multiple exciters may be disposed. For example, a total of four exciters may be disposed in positions near the four corners of the seating portion 81, as shown by reference signs a to d in FIG. 2. In this case, the signal level difference $\Delta G$ is calculated for each exciter by subtracting the value of the level of the seat vibration signal detected by each exciter from the value of the level of the vehicle body vibration signal detected by the acceleration sensor 60.

In the above-mentioned vehicle vibration alarm apparatuses 1 and 1a according to the present embodiment, the vibration signal detector 30 obtains the signal level difference ΔG by subtracting the value of the level of the seat vibration signal detected by the exciter 50 from the value of the level of the vehicle body vibration signal detected by the acceleration sensor 60. If the signal level difference ΔG is a predetermined value or greater (e.g., 30 dB), the vehicle vibration alarm apparatuses 1 and 1a according to the present embodiment may output an error message or the like indicating that a failure is occurring in the acceleration sensor 60 or exciter 50. That is, the vehicle vibration alarm apparatuses 1 and 1a may be provided with a failure diagnosis function of outputting such an error message.

Vibrations detected by the exciter 50 and acceleration sensor 60 of the vehicle vibration alarm apparatuses 1 and 1a according to the present embodiment mainly include vibrations transmitted from the road surface or engine during travel of the vehicle and vibrations transmitted from the engine during stop of the vehicle. The vibrations also include vibrations based on incoming low-band sounds from the outside of the vehicle and low-band sounds outputted (played back) by a speaker disposed in the vehicle. With respect to these low-band sound-based vibrations, the vehicle vibration alarm apparatuses 1 and 1a are able to produce advantageous effects similar to those described above.

While the vehicle vibration alarm apparatuses 1 and 1a according to the present embodiment use the exciter 50 as a vibration output unit and vibration detector, a vibration output unit and vibration detector are not limited to the exciter 50. Any other type of speaker, microphone, or the like may be used as the first signal converter and vibration converter of the notification apparatus and notification method according to the present invention as long as such a speaker or the like is able to perform, as a single device, the inverse processes, that is, conversion of an electrical signal into a vibration (vibration output) and conversion of a vibration into an electrical signal (vibration detection).

While the vehicle vibration alarm apparatuses 1 and 1a according to the present embodiment generate an alarm vibration signal using a sweep signal, an alarm vibration signal need not necessarily be generated on the basis of a sweep signal and may be generated on the basis of a signal that does not sweep and has a predetermined frequency. Even if a sweep signal is used, the frequency range to be swept is not limited to the frequency range described in the present embodiment (the frequency range from 36 to 52 Hz).

In the present embodiment, when the alarm information determination unit 31 stops continuously outputting update signals, the gain controller 32, envelope detector 33, smoother 34, decibel converter 35, and signal level determination unit 36 of the vibration signal detector 30 maintain data (values) indicating the results of the processes performed when receiving update signals lastly. Also, while output of update signals is stopped, that is, while alarm information is inputted to the alarm information determination unit 31, the gain controller 32, envelope detector 33, smoother 34, decibel converter 35, and signal level determination unit 36 continue the processes on the basis of the maintained data (values).

However, the notification apparatus and notification method according to the present invention are not limited to the configuration in which when the alarm information determination unit 31 according to the present embodiment stops periodically outputting update signals, all the functional elements 32 to 36 maintain the data (values) indicating the results of the processes performed when receiving update signals lastly and while output of update signals is stopped, the functional elements 32 to 36 continue the processes on the basis of the data (values). The notification apparatus and notification method according to the present invention only have to have a configuration in which when output of update signals is stopped, the signal level determination unit 36 outputs, to the alarm vibration signal controller 20, the value of the signal gain SG calculated immediately before stopping output of update signals.

For example, when periodic output of update signals is stopped, the gain controller 32, envelope detector 33, smoother 34, and decibel converter 35 may stop the processes. In this case, the signal level determination unit 36 continuously outputs the value of the signal gain SG to the alarm vibration signal controller 20 while maintaining (holding) the value of the signal gain SG calculated immediately before alarm information is inputted to the alarm information determination unit 31 (output of update signals is stopped). Thus, advantageous effects similar to those described in the present embodiment can be produced.

Also, one of the functional elements 32 to 36 may stop the process, and one of the others may perform the process using the data (values) indicating the results of the process performed when receiving update signals lastly. In this case, the signal level determination unit 36 only has to be able to output, to the alarm vibration signal controller 20, the value of the signal gain SG calculated immediately before alarm information is inputted to the alarm information determination unit 31.

REFERENCE SIGNS LIST

1, 1a vehicle vibration alarm apparatus (notification apparatus)
10 alarm vibration signal setter (notification signal generator, notification aspect determination unit)
20 alarm vibration signal controller (notification signal controller, notification aspect determination unit)
30 vibration signal detector (control level determination unit, level difference calculator, notification aspect determination unit)
30a level difference calculator
30b control level determination unit (control level determination unit, notification aspect determination unit)
31 alarm information determination unit
32 gain controller
33 envelope detector
34 smoother
35 decibel converter
36 signal level determination unit (control level determination unit, level difference calculator, notification aspect determination unit)
40 amplifier
50 exciter (first signal converter, notification execution unit, vibration converter, converter, vibration output unit, vibration detector, vibration generator)
51 alarm sound generator (notification sound output unit)
52 alarm display (notification information display)
55 notification execution unit
60 acceleration sensor (second signal converter)
80 vehicle seat (seat)
81 seating portion (cushion of seat)
82 backrest
83 headrest
85 frame
90 alarm situation detector (notification situation detector)
100 notification aspect determination unit

The invention claimed is:

1. A notification apparatus comprising:
a first signal converter disposed in a cushion of a seat and configured to detect a vibration transmitted to the seat and to convert the vibration into a seat vibration signal;
a second signal converter disposed in a position other than the cushion of the seat and configured to detect a transmitted vibration and to convert the vibration into an input vibration signal;
a level difference calculator configured to acquire the seat vibration signal from the first signal converter, to acquire the input vibration signal from the second signal converter, and to calculate a signal level difference $\Delta G$ by subtracting a value of a level of the seat vibration signal from a value of a level of the input vibration signal;
a notification aspect determination unit configured to determine a notification aspect for making a notification to a user, on the basis of a value of the signal level difference $\Delta G$ calculated by the level difference calculator; and
a notification execution unit configured to, when acquiring notification information outputted when a notification situation detector detects a situation about which a notification is made, make the notification on the basis of the notification aspect determined by the notification aspect determination unit,
wherein the notification aspect determination unit comprises:
a control level determination unit configured to determine a control level on the basis of the value of the signal level difference $\Delta G$ calculated by the level difference calculator;
a notification signal generator configured to generate a notification signal on the basis of the notification information; and
a notification signal controller configured to control a level of the notification signal generated by the notification signal generator on the basis of the control level determined by the control level determination unit,
wherein the notification execution unit is a vibration converter configured to convert the notification signal controlled by the notification signal controller into a notification vibration and to output the notification vibration in the seat, and
wherein the control level determination unit determines the control level such that the control level is inversely proportional to the value of the signal level difference $\Delta G$.

2. The notification apparatus according to claim 1, wherein
when the notification situation detector outputs the notification information, the control level determination unit maintains a value of the control level determined immediately before the notification information is outputted, and
while the notification information is outputted, the notification signal controller controls the level of the notification signal on the basis of the value of the control level maintained by the control level determination unit.

3. The notification apparatus according to claim 1, wherein
the notification aspect determination unit determines, as the notification aspect, one of a plurality of methods for making a notification, the methods differing from each other in a method for causing the user to perceive the notification, and
the notification execution unit makes the notification on the basis of the notification aspect determined by the notification aspect determination unit.

4. The notification apparatus according to claim 1, wherein
the first signal converter detects a vibration transmitted to the seat in a vehicle during travel of the vehicle and converts the vibration into the seat vibration signal, and
the second signal converter detects a vibration generated in the vehicle during travel of the vehicle and converts the vibration into the input vibration signal.

5. A notification apparatus comprising:
a first signal converter disposed in a cushion of a seat and configured to detect a vibration transmitted to the seat and to convert the vibration into a seat vibration signal;
a second signal converter disposed in a position other than the cushion of the seat and configured to detect a transmitted vibration and to convert the vibration into an input vibration signal;
a level difference calculator configured to acquire the seat vibration signal from the first signal converter, to acquire the input vibration signal from the second signal converter, and to calculate a signal level difference $\Delta G$ by subtracting a value of a level of the seat vibration signal from a value of a level of the input vibration signal;
a notification aspect determination unit configured to determine a notification aspect for making a notification to a user, on the basis of a value of the signal level difference $\Delta G$ calculated by the level difference calculator; and
a notification execution unit configured to, when acquiring notification information outputted when a notification situation detector detects a situation about which a notification is made, make the notification on the basis of the notification aspect determined by the notification aspect determination unit,
wherein the notification aspect determination unit comprises:
a control level determination unit configured to determine a control level on the basis of the value of the signal level difference $\Delta G$ calculated by the level difference calculator;
a notification signal generator configured to generate a notification signal on the basis of the notification information; and
a notification signal controller configured to control a level of the notification signal generated by the notification signal generator on the basis of the control level determined by the control level determination unit,
wherein the notification execution unit is a vibration converter configured to convert the notification signal controlled by the notification signal controller into a notification vibration and to output the notification vibration in the seat,
wherein the first signal converter and the vibration converter form the same converter, and
wherein the converter converts the vibration into the seat vibration signal and converts the notification signal into the notification vibration.

6. A notification method comprising:
- detecting, by a first signal converter disposed in a cushion of a seat, a vibration transmitted to the seat and converting the vibration into a seat vibration signal;
- detecting, by a second signal converter disposed in a position other than the cushion of the seat, a transmitted vibration and converting the vibration into an input vibration signal;
- acquiring, by a level difference calculator, the seat vibration signal from the first signal converter, acquiring the input vibration signal from the second signal converter, and calculating a signal level difference $\Delta G$ by subtracting a value of a level of the seat vibration signal from a value of a level of the input vibration signal;
- determining, by a notification aspect determination unit, a notification aspect for making a notification to a user, on the basis of a value of the signal level difference $\Delta G$ calculated by the level difference calculator; and
- when acquiring notification information outputted when a notification situation detector detects a situation about which a notification is made, making, by a notification execution unit, the notification on the basis of the notification aspect determined by the notification aspect determination unit,
- wherein the notification aspect determination unit comprises a control level determination unit, a notification signal generator, and a notification signal controller,
- wherein the notification execution unit comprises a vibration converter,
- wherein the control level determination unit determines a control level on the basis of the value of the signal level difference $\Delta G$ calculated by the level difference calculator,
- wherein the notification signal generator generates a notification signal on the basis of the notification information,
- wherein the notification signal controller controls a level of the notification signal generated by the notification signal generator on the basis of the control level determined by the control level determination unit,
- wherein the vibration converter converts the notification signal controlled by the notification signal controller into a notification vibration and outputs the notification vibration in the seat, and
- wherein the control level determination unit determines the control level such that the control level is inversely proportional to the signal level difference $\Delta G$.

7. The notification method according to claim 6, wherein when the notification situation detector outputs the notification information, the control level determination unit maintains a value of the control level determined immediately before the notification information is outputted, and
while the notification information is outputted, the notification signal controller controls the level of the notification signal on the basis of the value of the control level maintained by the control level determination unit.

8. The notification method according to claim 6, wherein the first signal converter and the vibration converter form the same converter, and
the converter converts the vibration into the seat vibration signal and converts the notification signal into the notification vibration.

9. The notification method according to claim 6, wherein the notification aspect determination unit determines, as the notification aspect, one of a plurality of methods for making a notification, the methods differing from each other in a method for causing the user to perceive the notification, and
the notification execution unit makes the notification on the basis of the notification aspect determined by the notification aspect determination unit.

10. The notification method according to claim 6, wherein the first signal converter detects a vibration transmitted to the seat in a vehicle during travel of the vehicle and converts the vibration into the seat vibration signal, and
the second signal converter detects a vibration generated in the vehicle during travel of the vehicle and converts the vibration into the input vibration signal.

* * * * *